US009736260B2

(12) United States Patent
Wheeldon (10) Patent No.: US 9,736,260 B2
(45) Date of Patent: Aug. 15, 2017

(54) REDIRECTING FROM A CLOUD SERVICE TO A THIRD PARTY WEBSITE TO SAVE COSTS WITHOUT SACRIFICING SECURITY

(75) Inventor: Richard Wheeldon, London (GB)

(73) Assignee: Cisco Technology, Inc., San Jose, CA (US)

( * ) Notice: Subject to any disclaimer, the term of this patent is extended or adjusted under 35 U.S.C. 154(b) by 1431 days.

(21) Appl. No.: 13/529,025

(22) Filed: Jun. 21, 2012

(65) Prior Publication Data

US 2013/0346472 A1 Dec. 26, 2013

(51) Int. Cl.
*G06F 15/16* (2006.01)
*H04L 29/08* (2006.01)
*H04L 29/06* (2006.01)

(52) U.S. Cl.
CPC ...... *H04L 67/2814* (2013.01); *H04L 63/0281* (2013.01); *H04L 67/02* (2013.01);
(Continued)

(58) Field of Classification Search
CPC ......... H04L 67/02; H04L 67/42; H04L 67/28; H04L 63/0281; H04L 67/2842; H04L 67/10; H04L 67/06; H04L 67/289; H04L 61/1511; H04L 67/2814; H04N 21/222; H04N 21/8456; H04N 21/4122; H04N 21/435; H04N 21/4622
See application file for complete search history.

(56) References Cited

U.S. PATENT DOCUMENTS 8,042,112 B1 * 10/2011 Zhu ................... G06F 17/30864
707/706
8,200,971 B2 6/2012 Edwards
(Continued)

FOREIGN PATENT DOCUMENTS

CN 101197843 A 6/2008
WO 02086717 A1 10/2002

OTHER PUBLICATIONS

International Search Report and Written Opinion in counterpart International Application No. PCT/US2013/041498, mailed Aug. 14, 2013.
(Continued)

*Primary Examiner* — Arvin Eskandarnia
*Assistant Examiner* — Thao Duong
(74) *Attorney, Agent, or Firm* — Edell, Shapiro & Finnan, LLC (57) ABSTRACT

Techniques are provided for receiving a request from a client proxy device to access a file on a server. The file is associated with a uniform resource locator (URL). In response to receiving the request, the server proxy device evaluates the request for presence of information that indicates that the client proxy device is able to obtain redirect instructions to access the file. When the evaluating indicates that the request includes the information, the server proxy device requests and receives identifier information associated with the URL from the server. The server proxy device retrieves from a database stored identifier information associated with the URL to compare it to the stored identifier information associated with the URL. When there is a match, the redirect instructions are sent to the client proxy device instructing the client proxy device to retrieve the file directly from the server.

18 Claims, 7 Drawing Sheets

(52) U.S. Cl.
CPC .......... *H04L 67/28* (2013.01); *H04L 67/2876* (2013.01); *H04L 63/145* (2013.01)

(56) References Cited

U.S. PATENT DOCUMENTS

| | | | |
|---|---|---|---|
| 8,352,484 B1* | 1/2013 | Schneider | G06F 21/563 |
| | | | 707/758 |
| 2001/0044824 A1 | 11/2001 | Hunter et al. | |
| 2001/0047428 A1* | 11/2001 | Hunter | G06F 17/3089 |
| | | | 709/245 |
| 2002/0178381 A1 | 11/2002 | Lee et al. | |
| 2005/0138176 A1* | 6/2005 | Singh | G06F 17/30902 |
| | | | 709/226 |
| 2005/0289237 A1* | 12/2005 | Matsubara | H04L 67/104 |
| | | | 709/232 |
| 2007/0055703 A1 | 3/2007 | Zimran et al. | |
| 2010/0172359 A1 | 7/2010 | Pande et al. | |
| 2011/0145435 A1* | 6/2011 | Bhatawdekar | G06F 21/566 |
| | | | 709/238 |
| 2011/0307951 A1 | 12/2011 | Yermakov | |
| 2011/0307954 A1 | 12/2011 | Melnik et al. | |
| 2011/0307955 A1 | 12/2011 | Kaplan et al. | |
| 2011/0307956 A1 | 12/2011 | Yermakov | |
| 2012/0066759 A1 | 3/2012 | Chen et al. | |
| 2012/0110186 A1 | 5/2012 | Kapur et al. | |
| 2013/0332574 A1* | 12/2013 | Lin | H04N 21/222 |
| | | | 709/219 |

OTHER PUBLICATIONS

Myers, et al., "The Content-MD5 Header Field," Network Working Group, Standards Track, RFC 1864, Oct. 1995.
English Translation of the First Office Action in counterpart Chinese Application No. 201380032715.9, Issued Dec. 27, 2016, 12 pages.

\* cited by examiner

| URL | FILENAME | TRAILING PATH SEGMENT | SECOND AND TOP LEVEL DOMAINS | TIMESTAMP | HIT COUNT | HTTP HEADERS | CHECKSUM | FILE TYPE |
|---|---|---|---|---|---|---|---|---|
| | | | | | | | | |

FIG.7

REDIRECTING FROM A CLOUD SERVICE TO A THIRD PARTY WEBSITE TO SAVE COSTS WITHOUT SACRIFICING SECURITY

TECHNICAL FIELD

The present disclosure relates to retrieving web content.

BACKGROUND

In many web server systems, a server proxy acts as an intermediate device between client devices and web servers. Requests from client devices for content hosted by web servers are routed to the server proxy before the content is delivered to the client devices. Some server proxies act as large-scale secure web proxies to validate the web content or files downloaded via the Internet. The server proxy ensures that web content is neither malicious (e.g., containing spyware, viruses, trojans or other malware) nor in violation of a company policy (e.g., security tools, games, illicit content, etc.). Typical network topologies also have a second proxy between the client devices and the server proxies. The second proxy is usually located on customer premises. Websites may be exceptioned on the second proxy when it is believed that the cost of redirecting a client device request to the server proxy exceeds the value gained from scanning the web content associated with the request.

DESCRIPTION OF EXAMPLE EMBODIMENTS

Overview

Techniques are provided for redirecting content requests from a cloud service to a third party website. A server proxy device receives a request from a client proxy device to access a file on a server. The file is associated (may be retrieved) with a uniform resource locator (URL). In response to receiving the request, the server proxy device evaluates the request for presence of information that indicates that the client proxy device is able to obtain redirect instructions to access the file directly from the server. When the evaluating indicates that the request includes the information, the server proxy device requests identifier information associated with the URL from the server, and the identifier information is received by the server proxy device. The server proxy device then retrieves from a database stored identifier information associated with the URL. The identifier information associated with the URL is compared to the stored identifier information associated with the URL to determine whether there is a match. When there is a match, the redirect instructions are sent to the client proxy device to instruct the client proxy device to retrieve the file associated with the URL directly from the server or another caching or mirror server.

Similarly, techniques are provided for performing operations from the perspective of the client proxy device. The client proxy device receives a request from a client device to access the file on the server associated with the URL. Information is appended to the request to indicate that the client proxy device is able to obtain redirect instructions to access the file directly from the server. The request with the information is forwarded to a server proxy device. The client proxy device then receives the redirect instructions from the server proxy device to retrieve the file associated with the URL directly from the server, and the file associated with the URL is retrieved from the server.

Example Embodiments

Figure 1:
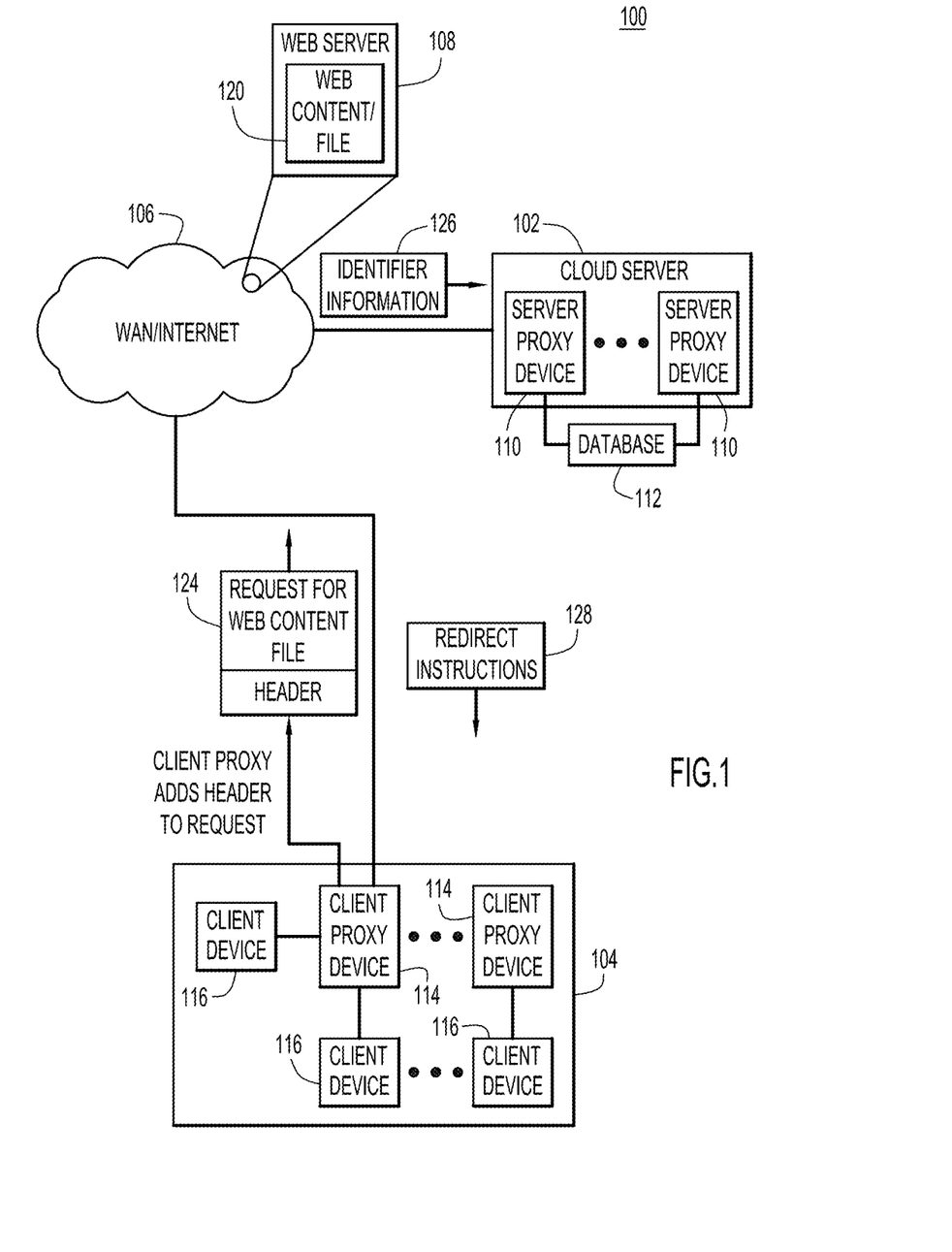
FIG. 1 shows an example topology depicting a cloud server, client network and a web server in communication with each other across a wide area network (WAN) for purposes of illustrating the redirection techniques described herein.

The techniques described herein are directed to evaluating and redirecting requests made for content hosted by a web server. An example topology 100 is illustrated in FIG. 1. The topology 100 comprises a cloud server 102 and a client network 104. The cloud server 102 and the client network 104 are configured to send and receive communications with each other across a wide area network (WAN), shown at reference numeral 106. In one example, the WAN 106 may be the Internet, but it should be understood that there may be intervening wired and wireless local area networks. Topology 100 also includes a web server 108. The web server 108 is configured to send and receive communications to components and devices in the cloud server 102 and the client network 104 over the WAN 106.

The cloud server 102 is configured to host a plurality of server proxy devices 110 ("server proxy"/"server proxies") that are configured to obtain and direct content from the client network 104 and the web server 108 as described by the techniques herein. The server proxy devices 110 are configured to communicate with a database 112 to retrieve, for example, information about content hosted by the web server 108, also as described according to the techniques herein. The database 112 may reside within one or more components of the cloud server 102 or may be external to the cloud server 102. In one example, the database 112 may be a set of local databases with messaging enabled between the local databases. For simplicity, topology 100 shows the database 112 as an external database. It should be appreciated that the components of the cloud server 102 may be hosted on software residing on one or more physical servers or physical devices that are in communication with the WAN 106 and are logically configured to be arranged within the cloud server 102. Likewise, the components of the cloud server 102 may be physical servers or physical devices (e.g., physical server proxy devices) or virtual machines hosted by one or more physical servers or physical devices.

The client network comprises a plurality of client proxy devices 114 ("client proxy"/"client proxies") that are configured to request and retrieve content from the cloud server 102 and the web server 108, as described herein. The client network 104 also comprises a plurality of client devices 116 which are configured to communicate with one or more of the client proxy devices 114. The client proxy devices 114 and client devices 116 may be part of an enterprise network or cluster that is located in the same geographic region. In one example, the client network 104 may be a local area network (LAN) of the client proxy devices 114 and the client devices 116. The client devices 116 may take the form of, for example, any web-enabled computing devices (e.g., computers, laptops, tablets, mobile devices, televisions, etc.) configured to send and receive communications across the WAN/Internet 106. In one example, there may be more than one client network, and for any one cloud server there may be thousands of client networks. The efficiency gains from the processing techniques described herein of one of the client networks may impact all of the remaining client networks.

The web server 108 is configured to host a web content/file 120 ("web content," "web file" or "file"). For example, the web server 108 may be a hardware or software component that is configured to host a file associated with a uniform resource indicator (URI) or a uniform resource locator (URL). The URI or URL is, for example, a pointer to a website that is accessible by one or more components within the topology 100.

As explained above, components of the cloud server 102, client network 104 and the web server 108 are configured to send and receive communications to/from each other across the WAN 106. For example, topology 100 shows multiple packets/communications exchanged between the cloud server 102, client network 104 and the web server 108. The communications are shown at reference numerals 124, 126 and 128 in FIG. 1 and are described in detail hereinafter. In general, these communications allow for a user (not shown in topology 100) of a client device 116 to request the web content/file 120 hosted by the web server 108 via the cloud server 102. Additionally, these communications allow for the server proxy devices 110 of the cloud server 102 to evaluate the request from the client device 116 in order to determine how the web content/file 120 should be delivered to the requesting client device 116.

Figure 2:
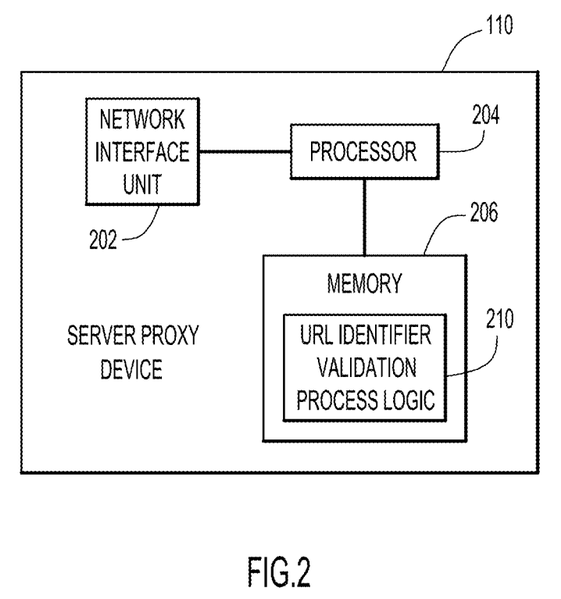
FIG. 2 shows an example of a server proxy device configured to send redirect instructions to a client proxy device that instructs the client proxy device in the client network to access content hosted on the web server.

Reference is now made to FIG. 2 that shows an example block diagram of a server proxy device 110. The server proxy device 110 comprises, among other components, a network interface unit 202, a processor 204 and a memory 206. The network interface unit 202 is configured to receive communications (e.g., data packets) sent across the WAN 106 and to send communications from the server proxy device 110 across the WAN 106. For simplicity, a single network interface unit 202 is shown in FIG. 2, but one with ordinary skill in the art would understand that the network interface unit 202 may comprise two interface components or instances: a first interface component or instance is configured to send and receive data communications across the WAN 106 and a second interface component or instance is configured to send and receive data communications within the cloud server 102. The network interface unit 202 is coupled to the processor 204. The processor 204 is, for example, a microprocessor or microcontroller that is configured to execute program logic instructions (i.e., software) for carrying out various operations and tasks of the server proxy device 110 described herein. For example, the processor 204 is configured to execute URL identifier validation process logic 210 that is stored in the memory 206 to send redirect instructions to one of the client proxy devices 114, as described herein. The functions of the processor 204 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 206 may comprise read only memory (ROM), random access memory (RAM), magnetic disk storage media devices, optical storage media devices, flash memory devices, electrical, optical, or other physical/tangible (non-transitory) memory storage devices. The memory 206 stores software instructions for the URL identifier validation process logic 210. The memory 206 may also store the database 112 that stores, for example, identifier information associated with a plurality of URLs and files hosted by the web server associated with the URLs. Thus, in general, the memory 206 may comprise one or more computer readable storage media (e.g., a memory storage device) encoded with software comprising computer executable instructions and when the software is executed (e.g., by the processor 204) it is operable to perform the operations described for the URL identifier validation process logic 210.

The URL identifier validation process logic 210 may take any of a variety of forms, so as to be encoded in one or more tangible computer readable memory media or storage device for execution, such as fixed logic or programmable logic (e.g., software/computer instructions executed by a processor), and the processor 204 may be an application specific integrated circuit (ASIC) that comprises fixed digital logic, or a combination thereof.

For example, the processor 204 may be embodied by digital logic gates in a fixed or programmable digital logic integrated circuit, which digital logic gates are configured to perform the URL identifier validation process logic 210. In general, the URL identifier validation process logic 210 may be embodied in one or more computer readable storage media encoded with software comprising computer executable instructions and when the software is executed operable to perform the operations described hereinafter.

Figure 3:
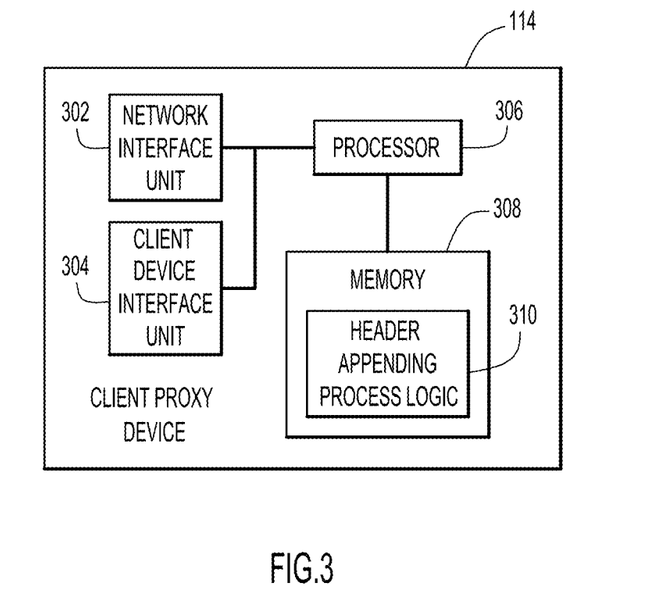
FIG. 3 shows an example of the client proxy device configured to append information to a request from a client device in the client network and to read redirects and validate checksum values for access to content hosted by the web server.

Reference is now made to FIG. 3 that shows an example block diagram of a client proxy device 114. The client proxy device 114 comprises a network interface unit 302, a client device interface unit 304, a processor 306 and a memory 308. The network interface unit 302 is configured to send and receive communications to components or devices in topology 100 across the WAN 106 in a similar manner described for the network interface unit 202 of the server proxy device 110. For simplicity, a single network interface unit 302 is shown in FIG. 3, but one will recognize that the network interface unit 302 of the client proxy device 114 may comprise two interface components or instances: a first interface component or instance configured to send and receive data communications across the WAN 106 and a second interface component or instance configured to send and receive data communications within the client network 104. The client device interface unit 304 is configured to send and receive communications to the client devices 116 within the client network 104. The network interface unit 302 and the client device interface unit 304 are coupled to the processor 306. The processor 306 is a microprocessor or microcontroller that is configured to execute program logic instructions (i.e., software) for carrying out various operations and tasks described herein. The processor 306 is configured to execute header appending process logic 310 stored in memory 308 to append information to a request for web content from a client device 116. The functions of the processor 306 and the memory 308 are similar to those described above for the server proxy device 110.

In general, a user of one of the client devices 116 (e.g., a computer) may attempt to access web content 120 hosted by the web server 108. For example, the user may click on a hyperlink displayed at a client device 116 to attempt to access a URL and the web content 120 associated with the URL hosted by the web server 108. There may be situations, however, where the content/files hosted by the web server 108 are malicious or otherwise harmful to one or more devices or data in the client network 104. Thus, before the web content 120 is delivered to the requesting client device 116, the web content 120 requested by the client device 116 may need to be evaluated to determine whether or not the web content 120 is malicious or otherwise presents a security threat to one or more devices in topology 100. The server proxy devices 110 in the cloud server 102 are configured to perform such an evaluation.

When a request is made by a client device 116 for access to web content on the web server 108, the request is routed across the WAN 106 to a server proxy device 110 in the cloud server 102. The particular routing details of the request to the corresponding server proxy device 110 may be governed by network policies established by an administrator of the client network 104, the cloud server 102 or other devices or services in topology 100. When the server proxy device 110 first receives the request sent by the client device 116, the server proxy device 110 retrieves the web content 120 (e.g., downloads the file or otherwise accesses the web content 120) from the web server 108 across the WAN 106. Upon subsequent requests, the server proxy device 110 executes the techniques described herein.

The server proxy device 110 evaluates the web content/file 120 (e.g., performs a "scan") to determine whether or not the content requested by the client device 116 is malicious. If the server proxy device 110 determines that the requested content is malicious, the server proxy device 110 will typically discard the content and will not allow the requesting client device 116 to access the content. Likewise, if the server proxy device 110 determines that the requested content is not malicious (e.g., "safe"), the server proxy device 110 will allow the requesting client device 116 to access the content. Thus, the server proxy device 110 operates as a filter or firewall for the client device 116 between requests for the web content 120 and the web content 120 itself. There are numerous techniques now known and hereinafter developed for scanning content to evaluate whether it is a security threat. The details of the various content scanning techniques are not described herein because they are not germane to the redirection techniques described herein.

The server proxy device 110 also stores information associated with the web content 120, the URL associated with the web content 120 and information indicating whether or not the web content 120 is determined to be malicious. This information is stored in the database 112. The server proxy device 110 can later utilize this information to make subsequent determinations of the maliciousness of subsequent requests for the web content 120 made by one or more of the client devices 116.

Figure 4:
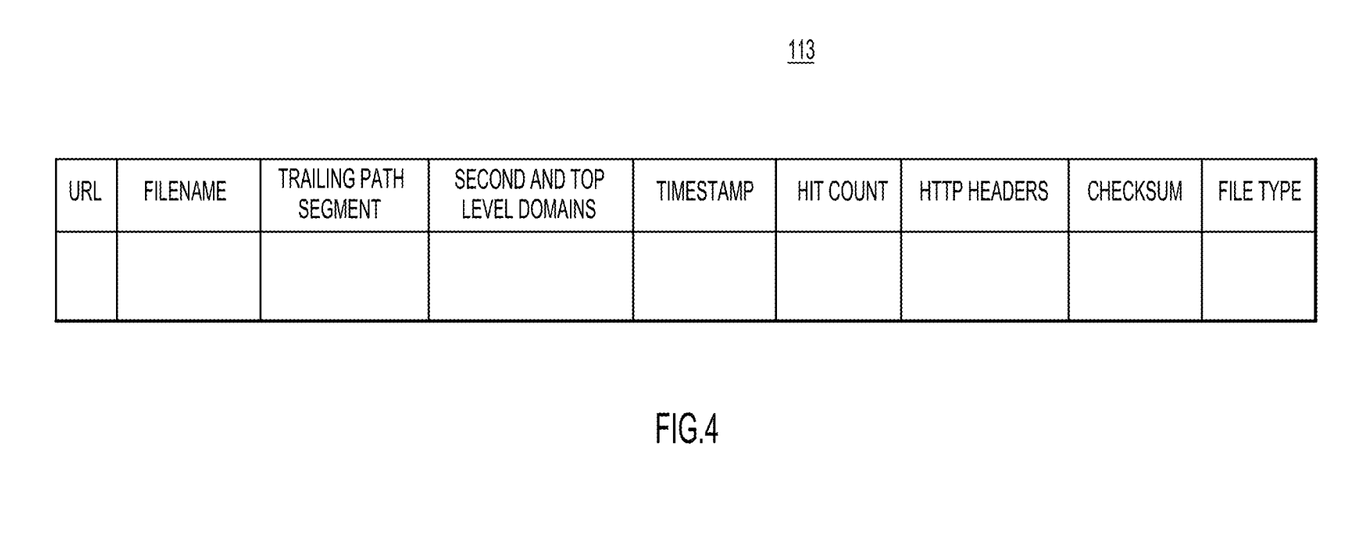
FIG. 4 illustrates a depiction of data fields of a database configured to store identifier information associated with a uniform resource locator (URL) that is associated with the file on the web server.

Reference is now made to FIG. 4, which shows examples of data fields 113 for the information stored in the database 112. The data fields 113 may comprise identifier information associated with a URL and web content or files associated with the URL. For example, as depicted in FIG. 4, the database 112 may store the URL, filename, trailing path segment and second and top level domains associated with the URL and the web content 120. Additionally, the database 112 may store information about the timestamp, hit count (e.g., default of one), hypertext transfer protocol (HTTP) headers (e.g., content-length, content-MD5 signature, last-modified, content-type, etc.), checksum (e.g., a secure checksum, secure hash algorithm such as SHA-1, etc.) and file type associated with the URL and the web content 120. In general, the information depicted in FIG. 4 is simply an example, and any identifier information associated with the URL and the web content 120 may be stored in the database 120. It should be appreciated that the details of all requests may not be stored in the database 112. For example, it may be decided that details for certain addresses (e.g., "ac.uk" addresses) are stored only in a location-centric database (e.g., United Kingdom-centric database for "ac.uk" addresses) since the performance gains from reduced processing are less than the cost of propagating the information to other databases.

In one example, there are three useful headers that may be used for identifying potential changes in the web content/file 120: (1) a content-length header (e.g., 1234567); (2) a content-type header (e.g., text/plain header); and (3) a content-MD5 header (e.g., 563eed557e83e173cdf9511ceda54aa). Any changes to these headers may be indicative that the web content/file 120 has changed in size and/or type of content, and thus, that the web content/file 120 is different. There also may be two metrics associated with the requests that may be used to verify whether or not the web content/file 120 has changed: (1) a request count; and (2) a change count. If the file changes every time it is downloaded, then additional redirects are not sent. If the file has only been downloaded once, then no information can be obtained from the file except for the initial information obtained during the downloading. However, if a file has been downloaded multiple times without any changes, the file is likely a good candidate to be redirected. Additionally, if the file has been downloaded multiple times and no change is apparent, the metrics can be shared across nodes within cloud server 102. Domain and path segment entries associated with the file enable a server proxy device 110 to de-duplicate the file. Category and other information may also be stored such that (acceptable use) policies can be re-applied to the file prior to it being downloaded. For example, the domain and path segment entries may evolve as follows:

http://example.com/foo
http://www.example.com/foo
http://mirrorsite.example.org/sites/www.example.com/foo As stated above, the server proxy device 110 may store the information in the database 112 upon scanning for the security/threat of the web content 120. The server proxy device 110 can evaluate this information upon receiving subsequent requests from one of the client devices 116 for access to the web content 120 hosted by the web server 108. In one example, if one of the client devices 116 later sends a new request for the same web content (e.g., web content 120) that the server proxy device 110 has already scanned and evaluated for maliciousness, the server proxy device 110 may utilize the information in the database 112 to determine whether or not the web content is malicious without having to retrieve (e.g., download) and scan the content again. This may be beneficial since, at times, the content downloading and scanning operations performed by the server proxy device 110 may be process and time intensive operations. Thus, for bandwidth and processing efficiency, it may be useful for the server proxy device 110 to be able to classify the content requested by one of the client devices 116 as malicious or non-malicious without having to download and scan the content again, if possible. By accessing the identifier information in the database 112 associated with the web content 120 and the URL associated with the web content 120, the server proxy device 110 can make the determination of maliciousness (or ascertain whether it can make the determination of maliciousness) without having to download the file from the web server 108 again. In this example, the server proxy device 110 can compare the stored identifier information already present in the database 112 to identifier information of the content and URL associated with the new request. If there is sufficient information in the database 112, the server proxy device 110 can determine the maliciousness of the content and adjust the new request accordingly.

Figure 5:
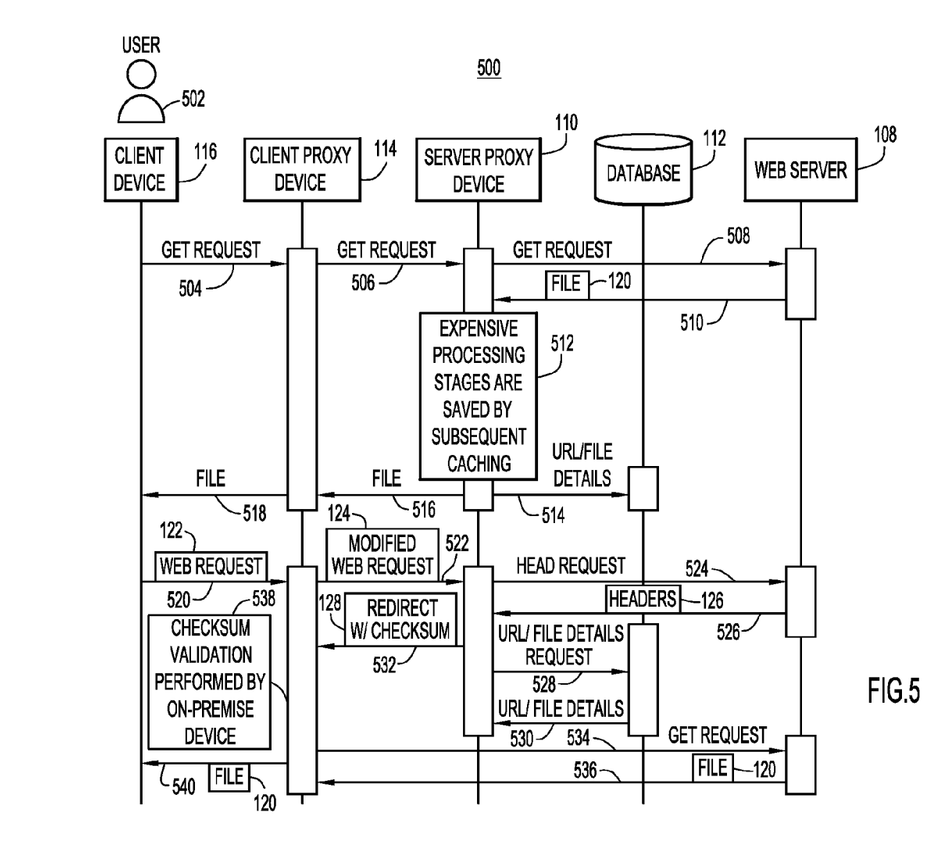
FIG. 5 shows an example interaction diagram depicting message exchanges between a client device, client proxy device, server proxy device, database and web server according to the redirection techniques described herein.

Reference is now made to FIG. 5 that shows an example ladder diagram 500 depicting message exchanges (e.g., communications or data packets) between components in the topology 100. FIG. 1 is also referred to in connection with the description of FIG. 5. As described above, a user 502 of one of the client devices 116 may attempt to request the web content 120 that is hosted by web server 108. At operation 504, the client device 116 may sent a request (e.g., a "get request") for the web content 120. For example, the user 502 selects a hyperlink or otherwise attempts to access a URL associated with the web content 120 via the client device 116. The get request is received by a corresponding client proxy device 114 (e.g., the client proxy device 114 in communication with the requesting client device 116), and the get request is forwarded to the server proxy device 110 (e.g., across the WAN 106) at operation 506. The server proxy device 110 forwards the get request to the web server 108 at operation 508, and in response, the web content ("file") 120 is sent from the web server 108 to the server proxy device 110 at operation 510. At operation 512, the server proxy device 110 scans the file 120 to determine whether or not the file 120 is malicious or otherwise presents a security threat. The server proxy device 110 may be configured, for example, with malicious content detection software or logic that is used to perform the scanning and to determine the malicious nature of the file 120. As stated above, this may be a processing intensive operation for the server proxy device 110.

After determining whether or not the file is malicious or potentially malicious, the server proxy device 110 stores, at operation 514, information about the file and the associated URL in the database 112. The information, for example, may be any one or more of the pieces of identifier information described above in connection with FIG. 4. If the server proxy device 110 determines that the file 120 is malicious, the server proxy device 110 discards the file 120. Operations 516 and 518 assume that the server proxy device 110 determines that the file 120 is not malicious. At operation 516, the server proxy device 110 sends the file 120 to the client proxy device 114, and the client proxy device 114, at operation 518, sends the file to the client device 116. Thus, the client device 116 obtains the file 120 associated with the get request initiated in operation 504.

As explained above, the client device 116 may make a subsequent request for the file 120. It should be appreciated, however, that the techniques described hereinafter are applicable to any client device in any client network 104 that makes a request for the file 120. In other words, any of the client devices in any client network 104 may initiate the techniques described hereinafter by requesting access to the file 120 from the web server 108. For simplicity, FIG. 5 shows the same client device 116 making, at operation 520, a subsequent web request for the file 120 associated with a URL. The web (content) request is shown at reference numeral 122. Operation 520 is also shown in FIG. 1 at label "A". The web request 122 is received by the client proxy device 114 (i.e., the client proxy device 114 that is in communication with the client device 116 making the web request 122), and at operation 522, the client proxy device sends a modified web request to the server proxy device. The modified web request is shown at reference numeral 124. Operation 522 is also shown in FIG. 1 at label "B". The modified web request contains information that is appended to the web request 122 by the client proxy device 114. This appended information operates as an identifier or status indicator to inform the server proxy device 110 that the device from which the modified web request originates (e.g., the client proxy device 114) is able to obtain redirect instructions to access the file directly 120 from the web server 108. As described herein, the client proxy device 114 may later receive such redirect instructions from the server proxy device 110.

Upon receiving the modified web request 124 (shown at label "C" in FIG. 1) from the client proxy device 114, the server proxy device 110 evaluates the modified web request 124 to determine whether or not the modified web request 124 contains the identifier or status indicator indicating that the client proxy device 114 is able to receive redirect instructions. Additionally, the client proxy device 114 can handle redirect codes (e.g., 30× redirect codes), validate the checksums of resultant content (e.g., files) and re-request access to the files in case of a mismatch. When the evaluating indicates that the request includes this information, the server proxy device 110, at operation 524, sends a request (e.g., a "head request") to the web server 108 for identifier information associated with the file 120 and the URL associated with the file 120. The web server 108, at operation 526, sends the identifier information (e.g., "headers") to the server proxy device. The headers are depicted at reference numeral 126. Operation 526 in FIG. 5 is also shown in FIG. 1 at label "D". The headers 126 may contain one or more or of the identifier information types described above in connection with FIG. 4. It should be appreciated that in operation 526, the file 120 is not sent to the server proxy device 110 (e.g., the server proxy device does not download the file 120 again).

After receiving the headers 126, the server proxy device 110, at operation 528, requests access to stored identifier information (e.g., "URL/file details") in database 112, and, at operation 530, the server proxy device 110 receives the URL file details. The server proxy device 110 then compares the headers 126 received from the web server 108 with the URL/file details retrieved from the database 112. For example, the server proxy device 110 may check identifier information in the headers such as the content-type, content-MD5, checksum, etc., with corresponding stored identifier in the database 112 for the same URL. If there is a match, the server proxy device 110 will make a determination that it is unlikely that the file 120 associated with the URL has changed. Additionally, the server proxy device 110 may attempt to identify mirror servers that may host the same web content/file 120 that is being requested. The server proxy device 110 then optionally updates the stored information in the database 112 (e.g., incrementing the hit count).

For example, updates to the database 112 by the server proxy device 110 may later be accessible by other server proxy devices in the cloud server 102 to perform the techniques described herein.

If there is not a match, the server proxy device 110 flags or marks the URL as being prone to change. Operations 532, 534, 536, 538 and 540 assume that the server proxy device 110 determines that there is a match between the headers 126 and the URL/file details of the URL. At operation 532, the server proxy device 110 sends a redirect with identifier information ("Redirect with checksum") to the client proxy device 114. This redirect is sent to the client proxy device 114 because the modified web request 124 previously received by the server proxy device 110 indicated that the client proxy device is able to receive such a redirect. The redirect with checksum is shown at reference numeral 128. Operation 532 is also shown in FIG. 1 at label "E." The redirect with checksum is a message that comprises redirect instructions from the server proxy device 110 for the client proxy device 114 to cause the client proxy device 114 to retrieve the file 120 associated with the URL directly from the web server 108 (e.g., across the WAN 106). In response to receiving these redirect instructions, the client proxy device 114, at operation 534, sends a request (e.g., "get request") to the web server 108 to obtain the file 120. In response, the web server 108, at operation 536, sends the file 120 to the client proxy device 114.

Upon receiving the file 120 from the web server 108, the client proxy device 114 validates the file 120 at operation 538. For example, the file 120 may have been changed or modified between the time that the server proxy device 110 received the headers 126 from the web server 108 (operation 526) and the time that the client proxy device 114 received the file 120 from the web server 108 (operation 536). Additionally, it is possible that the content is deliberately served to multiple, different locations. Thus, the validation operation at 538 is a further security measure to ensure that the file 120 has previously been validated as non-malicious by the server proxy device 110 and to ensure that if the file 120 has been changed (thus compromising the non-malicious status of file 120) it is not ultimately sent to the client device 116. At operation 538, the client device compares reference identifier information (e.g., checksum or other identifier information received from the server proxy device 110 in operation 532) with the file identifier information extracted from the file 120 after retrieving the file 120 in operation 536. If the comparing operation indicates that there is a match between the reference identifier information and the file identifier information, the file 120 is forwarded to the client device 116 at operation 540. If, however, the comparing operation does not indicate that there is a match, the client proxy device 114 classifies the file 120 as potentially malicious and the client proxy device 114 does not send the file 120 to the client device 116. Thus, the client proxy device 114 operates as another filter or firewall to prevent potentially harmful or malicious web content from reaching the client device 116. The client proxy device 114 may then optionally re-request the content via the server proxy device 110 (without the header, in order to prevent an infinite loop).

Figure 6:
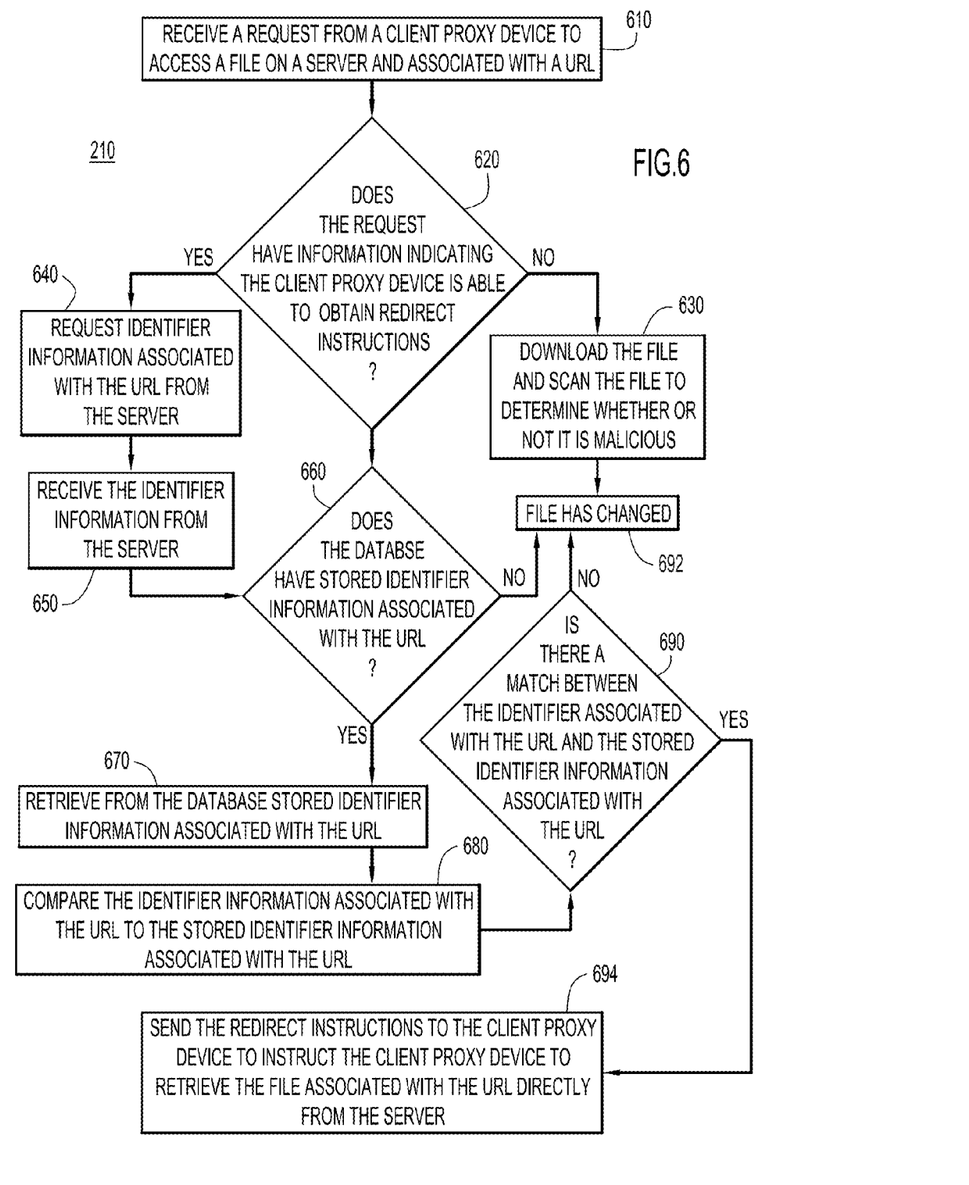
FIG. 6 shows an example flow chart depicting operations performed by the server proxy device to send to the client proxy device redirect instructions that instruct the client proxy device in the client network to access content hosted on the web server directly.

Reference is now made to FIG. 6. FIG. 6 shows a flow chart depicting operations of the URL identifier validation process logic 210 of the server proxy device 110. At 610, the server proxy device 110 receives a request from the client proxy device 114 to access a file on a server (web server 108) and associated with a URL. At 620, a determination is made as to whether the request has information indicating that the client proxy device 114 is able to obtain redirect instructions. If not, the server proxy device 110, at 630, downloads the file (file 120) associated with the request and scans the file to determine whether or not it is malicious (as shown in operations 510 and 512 in FIG. 5). If the request does have the information indicating that the client proxy device 114 is able to obtain redirect instructions, at 640, the server proxy device 110 requests identifier information associated with the URL from the server. At 650, the server proxy device 110 receives the identifier information from the web server 108. Operations 640 and 650 correspond to operations 524 and 526 shown in FIG. 5 and described above.

At 660, the server proxy device 110 determines whether the database 112 has stored identifier information that is associated with the URL. If not the server proxy device 110 reverts to operation 630. If the database does have stored identifier information associated with the URL (i.e., the answer to operation 660 is "yes"), at 670, the server proxy device 110 retrieves from the database 112 stored identifier information associated with the URL. Operation 670 corresponds to operation 530 depicted in FIG. 5. At 680, the server proxy device 110 compares the identifier information associated with the URL to the stored identifier information associated with the URL and, at 690, determines whether there is a match between the identifier associated with the URL and the stored identifier information associated with the URL. If there is no match, the server proxy device 110 determines, at 692, that the file has changed, and reverts to operation 630. If there is a match (i.e., the answer to operation 690 is "yes"), at 694, the server proxy device 110 sends the redirect instructions to the client proxy device 114 to instruct the client proxy device to retrieve the file associated with the URL directly from the server. Operation 694 is depicted in FIG. 5 as operation 532. Additionally, the process would continue by updating the database 112 and sending the content to the client device 116.

Figure 7:
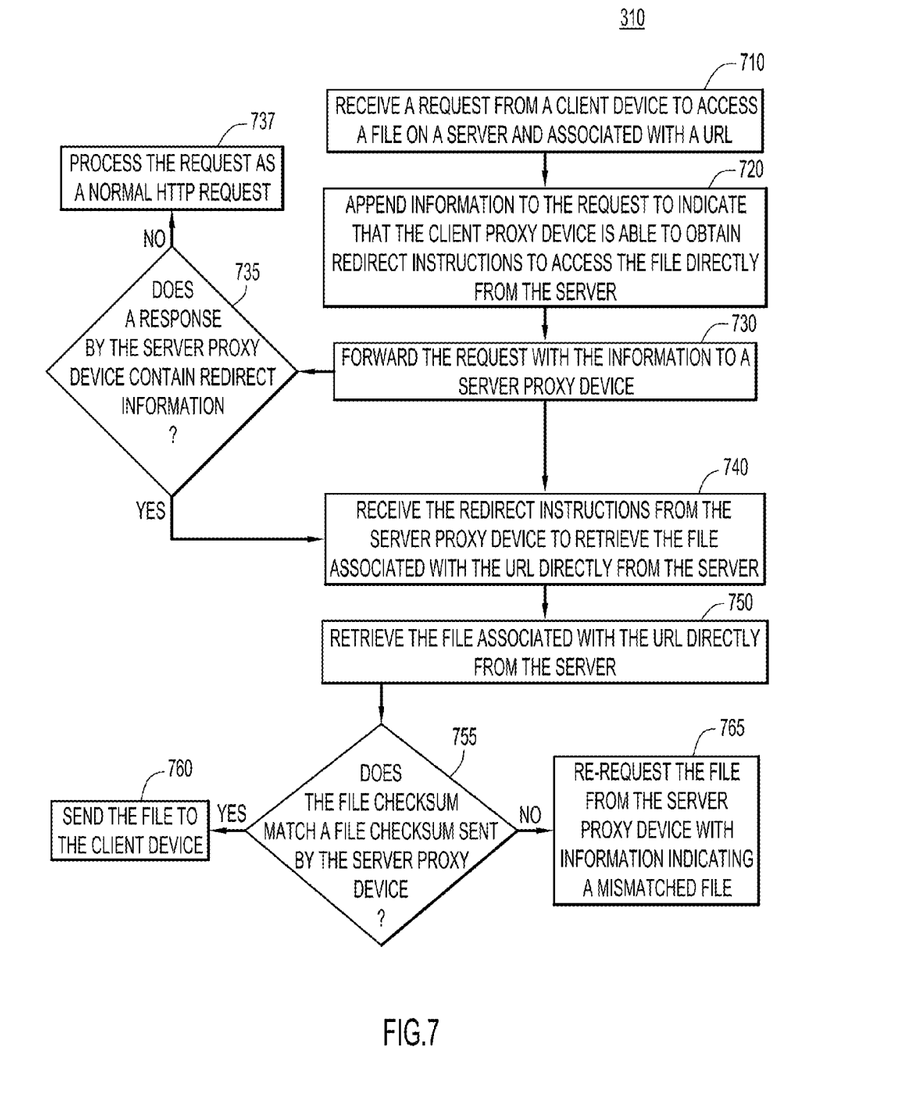
FIG. 7 shows an example flow chart depicting operations of the client proxy device to append information to a request from a client device in the client network for access to content hosted by the web server.

Reference is now made to FIG. 7, which shows a flow chart depicting operations of the header appending process logic 310 of the client proxy device 114. At 710, the client proxy device 114 receives a request from a client device (client device 116) to access a file (file 120) on a server (web server 108) and associated with a URL. Operation 710 corresponds to operation 520 depicted in FIG. 5. The client proxy device 114, at 720, appends the information to the request to indicate that the client proxy device 114 is able to obtain redirect instructions to access the file directly from the server. At 730, the client proxy device 114 forwards the request with the information to the server proxy device 110. Operation 730 corresponds to operation 522 shown in FIG. 5. After forwarding the request to the server proxy device 110, the client proxy device 114, at operation 735, determines whether a response by the server proxy device contains redirect information. If not, the client proxy device 114 processes the request as a normal HTTP request, at operation 737. If so (i.e., if the answer to the determination in operation 735 is "yes"), at 740, the client proxy device 114 receives redirect instructions from the server proxy device 110 to retrieve the file associated with the URL directly from the server. Operation 740 corresponds to operation 532 depicted in FIG. 5. In response, at 750, the client proxy device 114 retrieves the file associated with the URL directly from the server, as shown in reference 536 in FIG. 5. After retrieving the file associated with the URL, the client proxy device 114 determines, at 755, whether the file checksum value of the file matches a file checksum value sent to the client proxy device 114 by the server proxy device 110. If so, the file is sent to the client device 116 at operation 760, and if not, the client proxy device 114 re-requests, at 765, the file from the server proxy device 110 with information indicating a mismatched file was received.

It should be appreciated that the techniques described above in connection with all embodiments may be performed by one or more computer readable storage media encoded with software comprising computer executable instructions operable to perform the methods and steps described herein. For example, the operations performed by the web server 108, the server proxy devices 110, the client proxy devices 114 and the client devices 116 may be performed by one or more computer or machine readable storage media (non-transitory) or device executed by a processor and comprising software, hardware or a combination of software and hardware to perform the techniques described herein.

In sum, a method is provided comprising: at a server proxy device, receiving from a client proxy device a request to access a file on a server and associated with a uniform resource locator (URL); in response to the receiving, evaluating the request for presence of information that indicates that the client proxy device is able to obtain redirect instructions to access the file directly from the server; when the evaluating indicates that the request includes the information, requesting identifier information associated with the URL from the server; receiving the identifier information associated with the URL from the server; retrieving from a database stored identifier information associated with the URL; comparing the identifier information associated with the URL to the stored identifier information associated with the URL to determine whether there is a match; and when the comparing determines that there is the match, sending the redirect instructions to the client proxy device to instruct the client proxy device to retrieve the file associated with the URL directly from the server.

Additionally, a method is provided comprising: at a client proxy device, receiving a request from a client device to access a file on a server and associated with a uniform resource locator (URL); appending information to the request to indicate that the client proxy device is able to obtain redirect instructions to access the file directly from the server; forwarding the request with the information to a server proxy device; receiving the redirect instructions from the server proxy device to retrieve the file associated with the URL directly from the server; and retrieving the file associated with the URL directly from the server.

In addition, one or more computer readable storage media is provide that is encoded with software comprising computer executable instructions and when the software is executed operable to: receive from a client proxy device a request to access a file on a server and associated with a uniform resource locator (URL); evaluate the request for presence of information that indicates that the client proxy device is able to obtain redirect instructions to access the file directly from the server; when the request includes the information, request identifier information associated with the URL from the server; receive the identifier information associated with the URL from the server; retrieve from a database stored identifier information associated with the URL; compare the identifier information associated with the URL to the stored identifier information associated with the URL to determine whether there is a match; and send the redirect instructions to the client proxy device to instruct the client proxy device to retrieve the file associated with the URL directly from the server when there is the match.

Furthermore, one or more computer readable storage media is provide that is encoded with software comprising computer executable instructions and when the software is executed operable to: receive a request from a client device to access a file on a server and associated with a uniform resource locator (URL); append information to the request indicating an ability to obtain redirect instructions to access the file directly from the server; forward the request with the information to a server proxy device; receive the redirect instructions from the server proxy device to retrieve the file associated with the URL directly from the server; and retrieve the file associated with the URL directly from the server.

Additionally, an apparatus is provided comprising: a network interface unit; a memory unit; and a processor coupled to the network interface unit and the memory and configured to: receive from a client proxy device a request to access a file on a server and associated with a uniform resource locator (URL); evaluate the request for presence of information that indicates that the client proxy device is able to obtain redirect instructions to access the file directly from the server; when the request includes the information, request identifier information associated with the URL from the server; receive the identifier information associated with the URL from the server; retrieve from a database stored identifier information associated with the URL; compare the identifier information associated with the URL to the stored identifier information associated with the URL to determine whether there is a match; and send the redirect instructions to the client proxy device to instruct the client proxy device to retrieve the file associated with the URL directly from the server when there is the match.

In addition, an apparatus is provided comprising: a network interface unit; a client device interface unit; a memory unit; and a processor coupled to the network interface unit the client device interface unit and the memory unit and configured to: receive a request from a client device to access a file on a server and associated with a uniform resource locator (URL); append information to the request indicating an ability to obtain redirect instructions to access the file directly from the server; forward the request with the information to a server proxy device; receive the redirect instructions from the server proxy device to retrieve the file associated with the URL directly from the server; and retrieve the file associated with the URL directly from the server.

The above description is intended by way of example only. Various modifications and structural changes may be made therein without departing from the scope of the concepts described herein and within the scope and range of equivalents of the claims.

What is claimed is:

1. A method comprising:
   at a server proxy device, receiving from a client proxy device a request to access a file that is on a server and associated with a uniform resource locator (URL);
   in response to the receiving, evaluating the request to determine when the request includes information that indicates that the client proxy device is able to obtain redirect instructions to access the file directly from the server;
   when the evaluating indicates that the request includes the information, requesting identifier information associated with the URL from the server;
   receiving the identifier information associated with the URL from the server;
   retrieving stored identifier information associated with the URL from a database;

comparing the identifier information associated with the URL to the stored identifier information associated with the URL to determine at least one of a request count or a change count associated with the URL;

determining whether the file associated with the URL is expected to remain unchanged based on at least one of the request count or the change count;

identifying mirror servers of the server from which the file is also retrievable; and when the comparing determines that the file is expected to remain unchanged, sending the redirect instructions to the client proxy device to instruct the client proxy device to retrieve the file associated with the URL directly from one of the mirror servers.

2. The method of claim 1, wherein receiving the identifier information associated with the URL comprises receiving one or more of: a filename, trailing path segments of the URL, second and top level domains of the URL, a timestamp of retrieval of the file, a hit count associated with the URL, hypertext transfer protocol (HTTP) response headers, a checksum value and a file type associated with the file.

3. The method of claim 1, wherein sending the redirect instructions comprises sending the redirect instructions such that the server proxy device does not have to download the file from the server.

4. The method of claim 1, further comprising updating the database to include the identifier information associated with the URL received from the server.

5. The method of claim 1, wherein sending the redirect instructions comprises sending the redirect instructions to the client proxy device to instruct the client proxy device to retrieve the file associated with the URL without the server proxy having to determine whether or not the file is malicious or otherwise presents a security threat.

6. The method of claim 1, wherein sending the redirect instructions to the client proxy device comprises sending the redirect instructions comprising a secure hash.

7. One or more non-transitory computer readable storage media encoded with software comprising computer executable instructions and when the software is executed operable to:

receive from a client proxy device a request to access a file that is on a server and associated with a uniform resource locator (URL);

evaluate the request to determine when the request includes information that indicates that the client proxy device is able to obtain redirect instructions to access the file directly from the server;

when the request includes the information, request identifier information associated with the URL from the server;

receive the identifier information associated with the URL from the server;

retrieve stored identifier information associated with the URL from a database;

compare the identifier information associated with the URL to the stored identifier information associated with the URL to determine at least one of a request count or a change count associated with the URL;

determine whether the file associated with the URL is expected to remain unchanged based on at least one of the request count or the change count;

identify mirror servers of the server from which the file is also retrievable; and send the redirect instructions to the client proxy device to instruct the client proxy device to retrieve the file associated with the URL directly from one of the mirror servers when the file is expected to remain unchanged.

8. The computer readable storage media of claim 7, wherein the instructions operable to receive the identifier information associated with the URL comprise instructions operable to receive one or more of: a filename, trailing path segments of the URL, second and top level domains of the URL, a timestamp of retrieval of the file, a hit count associated with the URL, hypertext transfer protocol (HTTP) response headers, a checksum value and a file type associated with the file.

9. The computer readable storage media of claim 7, wherein the instructions operable to send the redirect instructions comprise instructions operable to send redirect instructions without having to download the file from the server.

10. The computer readable storage media of claim 7 further comprising instructions operable to update the database to include the identifier information associated with the URL received from the server.

11. The computer readable storage media of claim 7, wherein the instructions operable to send the redirect instructions comprise instructions operable to send the redirect instructions to the client proxy device to instruct the client proxy device to retrieve the file associated with the URL without having to determine whether or not the file is malicious or otherwise presents a security threat.

12. The computer readable storage media of claim 7, wherein the redirect instructions comprise a secure hash.

13. An apparatus comprising:
a network interface unit;
a memory unit; and
a processor coupled to the network interface unit and the memory and configured to:

receive from a client proxy device a request to access a file that is on a server and associated with a uniform resource locator (URL);

evaluate the request to determine when the request includes information that indicates that the client proxy device is able to obtain redirect instructions to access the file directly from the server;

when the request includes the information, request identifier information associated with the URL from the server;

receive the identifier information associated with the URL from the server;

retrieve stored identifier information associated with the URL from a database;

compare the identifier information associated with the URL to the stored identifier information associated with the URL to determine at least one of a request count or a change count associated with the URL;

determine whether the file associated with the URL is expected to remain unchanged based on at least one of the request count or the change count;

identify minor servers of the server from which the file is also retrievable; and send the redirect instructions to the client proxy device to instruct the client proxy device to retrieve the file associated with the URL directly from one of the mirror servers when the file associated with the URL is expected to remain unchanged.

14. The apparatus of claim 13, wherein the processor is configured to send the redirect instructions without having to download the file from the server.

15. The apparatus of claim 13, wherein the processor is configured to receive the identifier information associated with the URL by receiving one or more of: a filename, trailing path segments of the URL, second and top level domains of the URL, a timestamp of retrieval of the file, a hit count associated with the URL, hypertext transfer protocol (HTTP) response headers, a checksum value or a file type associated with the file.

16. The apparatus of claim 13, wherein the processor is further configured to:
   update the database to include the identifier information associated with the URL received from the server.

17. The apparatus of claim 13, wherein the processor is configured to send the redirect instructions to the client proxy device to instruct the client proxy device to retrieve the file associated with the URL without having to determine whether or not the file is malicious or otherwise presents a security threat.

18. The apparatus of claim 13, wherein the redirect instructions comprise a secure hash.

* * * * *

UNITED STATES PATENT AND TRADEMARK OFFICE
CERTIFICATE OF CORRECTION

PATENT NO. : 9,736,260 B2  
APPLICATION NO. : 13/529025  
DATED : August 15, 2017  
INVENTOR(S) : Richard Wheeldon Page 1 of 1

It is certified that error appears in the above-identified patent and that said Letters Patent is hereby corrected as shown below:

In the Claims

In Column 14, Line 56, delete "minor" and input --mirror--.

Signed and Sealed this  
Thirteenth Day of March, 2018

Andrei Iancu  
*Director of the United States Patent and Trademark Office*